B. O. COPENHAVER.
FLY CATCHER.
APPLICATION FILED JULY 11, 1913.
1,099,342.
Patented June 9, 1914.
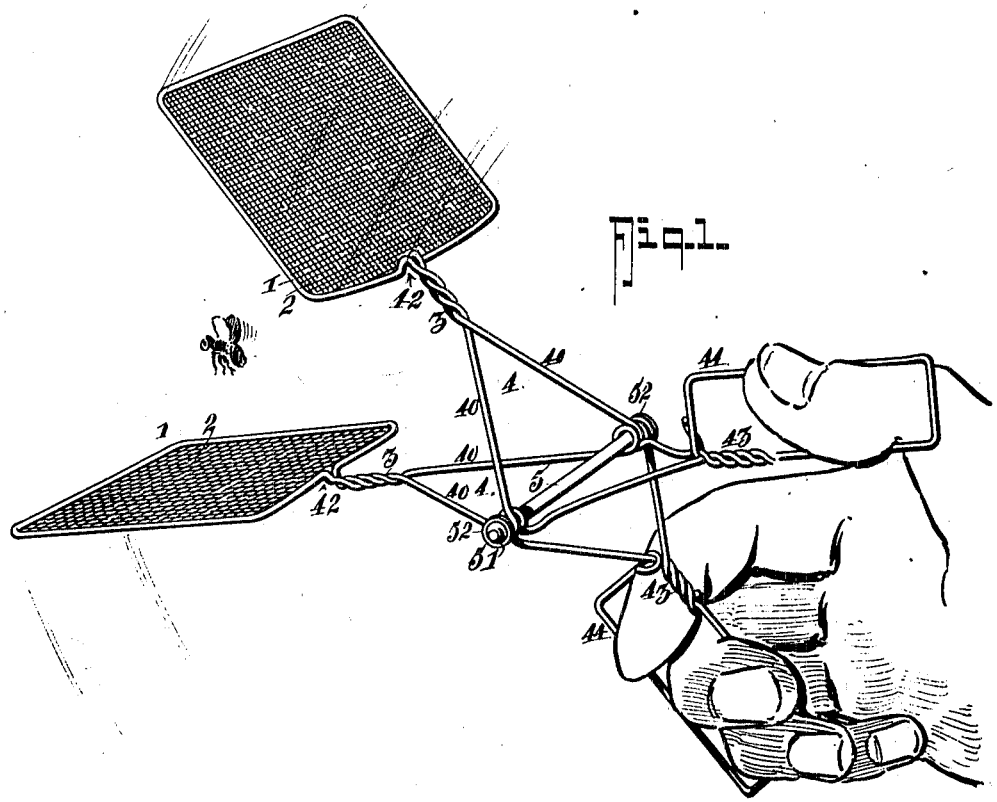
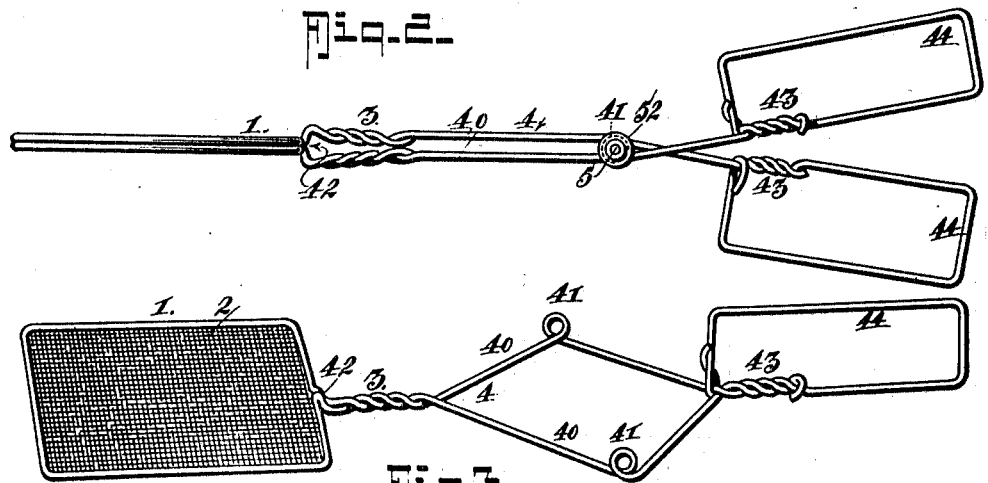
WITNESSES:
John A. Schrott
Charles J. Diller
INVENTOR
B. O. Copenhaver
BY
Fred G. Dieterich
ATTORNEYS.

UNITED STATES PATENT OFFICE.

BERT O. COPENHAVER, OF HUTCHINSON, KANSAS.

FLY-CATCHER.

1,099,342.

Specification of Letters Patent.  Patented June 9, 1914.

Application filed July 11, 1913. Serial No. 778,497.

*To all whom it may concern:*

Be it known that I, BERT O. COPENHAVER, residing at Hutchinson, in the county of Reno and State of Kansas, have invented a new and Improved Fly-Catcher, of which the following is a specification.

My invention, which is designed for catching flies and other winged insects, more particularly has for its purpose to provide a very simple and inexpensive device, especially adapted to swat the insect and at the same time catch or hold the said insect and thereby avoid killing the insect by mashing it on the object upon which it may have landed.

Another object of my invention is to provide a device of the character stated from which the caught and mashed insect may be readily discharged, which can be easily kept clean and which is easily manipulated for catching flies, bees, wasps and the like.

My invention consists of a device for the purposes stated that embodies the peculiar construction and novel arrangement of parts, all of which will be hereinafter fully explained, specifically pointed out in the appended claims, and illustrated in the accompanying drawing, in which—

Figure 1 is a perspective view of my device, the same being shown as in use. Fig. 2 is a side view of the same, the parts being shown at the "closed" position. Fig. 3 is a perspective view of one of the members, that constitute the clamping body and the handhold portions of the device.

In carrying out my invention, I provide a pair of opposing members, each of which includes a mashing or "swatting" portion, a central or body section and an outer or handle portion, the two sections being pivotally joined like a pair of pliers whereby the two sections may be opened and closed "scissors-like," for causing the "swatting" members to close against each other or to spread apart as desired.

The entire device, on the score of economy, is bent up from wire, each section comprising a frame bent up from a single wire strand. In bending the said single wire strands to the desired shapes the strand is first looped midway its length and bent into a rectangular frame 1, a fine wire mesh screen 2 that covers the loop frame, being made fast at its sides and ends by soldering or otherwise securing it to the frame, the opposing portions 2 forming the "swatting" members adapted for simultaneously catching and killing the flies and other like insects. From the inner cross bar of the frame 1, the wire ends are twisted to form a strong shank 3 in the horizontal plane of the body 2 and from the shank 3, the wire ends are spread and form the diamond shaped body portion 4 the sides 40, which at their apex points are coiled to form bearing loops 41 for receiving the pivot rod or pin 5, which may be held secure in the loops 41 by the heads 51 and the washer 52, as shown. At the end of the diamond shaped body portion the ends of the wire strand are twisted about to form a short shank 43 and one end of the said strand, which is longer than the other end, is extended and bent to form a bail 44 disposed in a plane at right angles to the diamond shaped body to form a hand or finger hold. By bending up the wire strand to the shape shown and described, the two sections of the device can be handled like a pair of pliers, and by reason of the large opposing "swatting" surfaces, the user can readily "swat" the fly or other insect as it leaves its perch, it being apparent that the insect that is caught and crushed between the said "swatting" surfaces can be readily deposited where desired by tapping the edge of the device or dipping it into and rinsing the same in water. To insure a perfect closure of the "swatting" surfaces against each other, the twisted shank of each section is bent at right angles as at 42, so as to bring the opposing or screened frames into a positive contact when they are closed.

My invention, by reason of its simple and economical construction, is adapted for universal use, and in ordinary rooms will be found especially beneficial on account of the simple handling and manipulation of the same permits of their promiscuous use by children as well as adults.

What I claim is:

1. A fly catcher comprising two members pivotally connected together and each member being formed of a single strand of wire looped upon itself to form a frame adapted to receive a covering, then twisted to form a coiled shank, then bent to form a diamond shaped body, the said body including coiled portions that form pivot eyes, then bent into a coiled shank, one end of the wire strand being then extended and bent into a handle loop and a pivot member for joining the pivot eyes of the two parts of the catcher.

2. A fly catcher comprising two parts pivotally connected together and each being formed of a single wire strand looped upon itself to form a frame for receiving a flat covering, then twisted to form a coiled shank, the said shank being disposed in a plane parallel with but below the surface of the catcher frame, the said wire strand being then bent into a diamond-shaped body, the said body including coiled portions forming pivot eyes, said wire strand being then bent into a handle loop, and a pivot pin for joining the two members together.

BERT O. COPENHAVER.

Witnesses:
CHAS. W. RAGLAND,
A. D. WATTS.